United States Patent [19]
Kono

[11] Patent Number: 5,968,209
[45] Date of Patent: Oct. 19, 1999

[54] METHOD FOR MANUFACTURING A SOLID ELECTROLYTIC CAPACITOR

[75] Inventor: Takashi Kono, Tokyo, Japan

[73] Assignee: NEC Corporation, Tokyo, Japan

[21] Appl. No.: 08/844,246

[22] Filed: Apr. 18, 1997

[30] Foreign Application Priority Data

Apr. 25, 1996 [JP] Japan ................................. 8-105220

[51] Int. Cl.[6] .................................................. H01L 21/20
[52] U.S. Cl. ........................ 29/25.03; 29/25.01; 29/832; 216/6; 427/79; 438/171; 438/190; 438/381
[58] Field of Search .............................. 29/25.03, 25.01, 29/832; 216/6; 257/68, 924; 307/109; 427/79; 438/171, 190, 381

[56] References Cited

U.S. PATENT DOCUMENTS 5,062,025  10/1991  Verhoeven et al. ..................... 361/509

FOREIGN PATENT DOCUMENTS

| 62-2762 | 1/1987 | Japan | ................................ H01G 9/12 |
| 246715 | 2/1990 | Japan | ................................ H01G 9/12 |
| 407106205 | 9/1993 | Japan | ............................... H01G 9/012 |

*Primary Examiner*—Tuan H. Nguyen
*Assistant Examiner*—Craig Thompson
*Attorney, Agent, or Firm*—Hayes Soloway Hennessey Grossman & Hage PC

[57] ABSTRACT

Cathode and anode sides of a plurality of solid electrolytic capacitors are connected by simultaneous electric welding. The welding step is effected to connect an anode lead of a lead frame to the anode electrode of a capacitor body and simultaneously connect a cathode lead of the lead frame to the cathode conductor layer of an adjacent capacitor body. The welding electrode for the cathode lead exerts moderate force to the capacitor bodies using a spring function of the capacitor lead. The simultaneous welding for the adjacent capacitor bodies and the moderate force prevent electrical and mechanical damages of the insulator layer of the solid electrolytic capacitors during the welding.

13 Claims, 5 Drawing Sheets

METHOD FOR MANUFACTURING A SOLID ELECTROLYTIC CAPACITOR

BACKGROUND OF THE INVENTION (a) Field of the Invention

The present invention relates to a method for manufacturing a solid electrolytic capacitor and, more particularly, to a process for connecting a cathode conductor layer with a cathode lead in a solid electrolytic capacitor.

(b) Description of the Related Art

Some solid electrolytic capacitors use a valve-function metal such as tantalum. Fabrication of such a solid electrolytic capacitor (may be referred to as electrolytic capacitor or simply capacitor hereinafter) includes a step for connection between a pair of electrodes, which include an anode electrode and a cathode conductor layer, and a pair of external lead wires, which include an anode lead and a cathode lead. In a conventional fabrication process, the connection between the anode electrode and the anode lead is usually effected by electric welding. On the other hand, the connection between the cathode conductor layer and the cathode lead is effected by several methods, which involve problems to be solved. A variety of proposals and studies have been made to solve the problems.

Examples of the connection between the cathode conductor layer and the cathode lead include the use of a conductive adhesive, such as a silver paste, wherein conductive fillers such as silver particles and an adhesive such as epoxy resin are admixed. FIG. 1 shows a sectional view of an example of conventional solid electrolytic capacitors fabricated by using the conductive adhesive. The capacitor comprises a capacitor body 11, an anode electrode 12 protruding from the top surface of the capacitor body 11, and a conductor layer 13 constituting a cathode electrode formed on the side and bottom surfaces of the capacitor body 11. The cathode lead 16 is electrically connected and fixed to the cathode conductor layer 13 by a conductive adhesive 23.

The conventional capacitor of FIG. 1 requires separate steps for connection on the anode side (between the anode lead 15 and the anode electrode 12) effected by electric welding and for connection on the cathode side (between the cathode lead 16 and the cathode conductor layer 13) effected by the conductive adhesive 23, resulting in a lower throughput of the capacitors. In addition, the connection on the cathode side requires a heat treatment for a certain length of time, which further lowers the throughput of the capacitors.

Examples of the connection on the cathode side include the use of a soldering technique. A soldering technique using a pulse thermal treatment is described in Publication NO. JP-A-1990-46715, which includes in essence the steps of mounting the capacitor body on a pre-heated hot plate, and removing the capacitor body therefrom after a given length of time to thereby apply a pulse thermal energy to the capacitor body. The waveform of the pulse thermal energy has a rapid rise, a rapid fall and a high amplitude.

The soldering connection on the cathode side requires separate operations for the anode side and cathode side, similarly to the case of the conductive adhesive. Also, the soldering technique requires a relatively large length of time, for example, several seconds, for the pulse heating, which also lowers the throughput of the capacitors.

A proposal is made which uses the electric welding for the connection on the cathode side. Examples for the electric welding include a parallel gap welding in which welding current flows between a pair of parallel welding electrodes disposed in the vicinity of the connection. FIG. 2 shows a top plan view of the capacitor during the parallel gap welding, which is disclosed in UM Publication No. JP-B-1987-2762. A cathode lead 16 running parallel to the bottom surface of the capacitor body 11 in spaced relationship therewith is connected to the capacitor electrode (not shown) by a fuse 24, which is welded by the parallel gap welding technique for bridging the cathode lead 16 and the cathode electrode. The parallel gap welding using the electric welding, however, generally requires a relatively large space for the welding, which is not suited to a small-sized product.

Another electric welding known in other technical fields applies a pressing force between a pair of welding electrodes sandwiching therebetween an element to be welded. If this technique is used in fabrication of a capacitor, the pressure is applied directly to the capacitor body to thereby damage the insulator film etc. of the capacitor body thereby increasing the leakage current between the electrodes. Accordingly, the characteristics or reliability of the capacitor is lowered.

SUMMARY OF THE INVENTION

In view of the forgoing, it is an object of the present invention to provide a method for fabricating a reliable, smallsized solid electrolytic capacitor with a high throughput.

The present invention provides a method for manufacturing a solid electrolytic capacitor comprising the steps of preparing a capacitor body having an anode electrode protruding from the capacitor body and a cathode conductor layer formed on the capacitor body, connecting an anode lead to the anode electrode, making a first portion of a cathode lead in contact with the cathode conductor layer with an intervention of a solder layer, making first and second welding electrodes in contact with a second portion of the cathode lead adjacent to the first portion and the cathode conductor layer, respectively, pressing the first welding electrode toward the second welding electrode to thereby press the first portion to the cathode conductor layer, supplying welding current between the first welding electrode and second welding electrode to connect the cathode conductor layer to the cathode lead with the solder.

The preferred embodiment of the present invention comprises the steps of preparing a lead frame having a plurality of lead pairs each including an anode lead and a cathode lead opposed to each other, each cathode lead having a first portion and a second portion adjacent to the first portion, preparing a plurality of capacitor bodies each having an anode electrode protruding from the each of the capacitor bodies and a cathode conductor layer formed on the each of the capacitor bodies, arranging the capacitor bodies correspondingly to the lead pairs to make the anode leads in contact with the anode electrodes of the respective capacitor bodies and to make the first portions of the cathode leads in contact with the cathode conductor layers of the respective capacitor bodies with an intervention of respective solder layers, making first and second welding electrodes in contact with one of the anode leads and the second portion of one of the cathode leads, respectively, making a third electrode in contact with the anode electrodes and the cathode conductor layers, pressing the first and second welding electrodes toward the third welding electrode to thereby press the one of the anode leads to a corresponding one of the anode electrodes and the first portion of the one of the cathode leads to a corresponding one of the cathode conductor layers, supplying welding current between the first and second welding electrodes and third welding electrode to connect the one of the anode leads to the corresponding one of the anode electrodes and the first portion of the one of the cathode leads to the corresponding one of the cathode conductor layers.

In accordance with the method of the present invention, solid electrolytic capacitors having excellent characteristics and a high reliability can be fabricated with a high throughput and at a low ratio of the defective products.

The above and other objects, features and advantages of the present invention will be more apparent from the following description, referring to the accompanying drawings.

DESCRIPTION OF THE PREFERRED EMBODIMENTS

Figure 1:
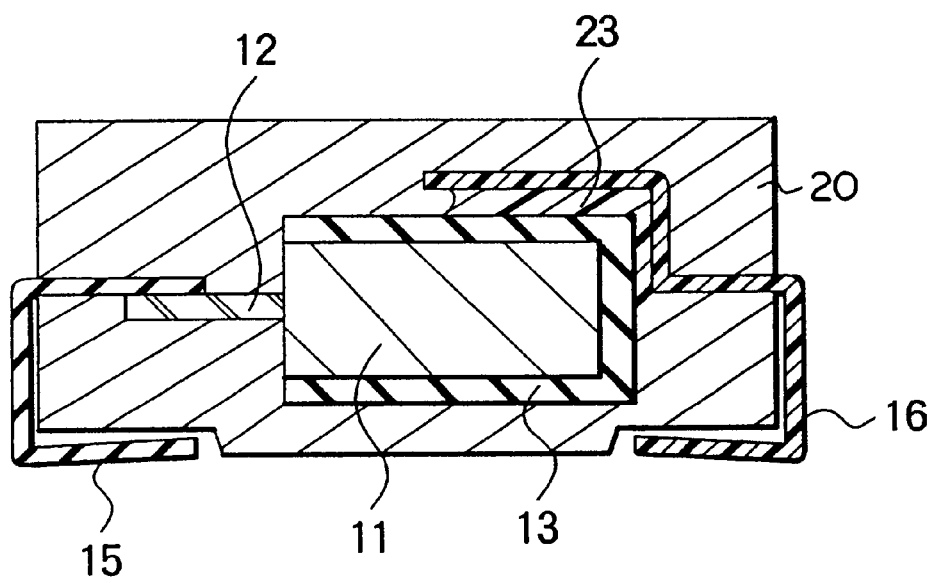
FIG. 1 is a longitudinal sectional view of a capacitor fabricated, by a conventional method.
Figure 2:
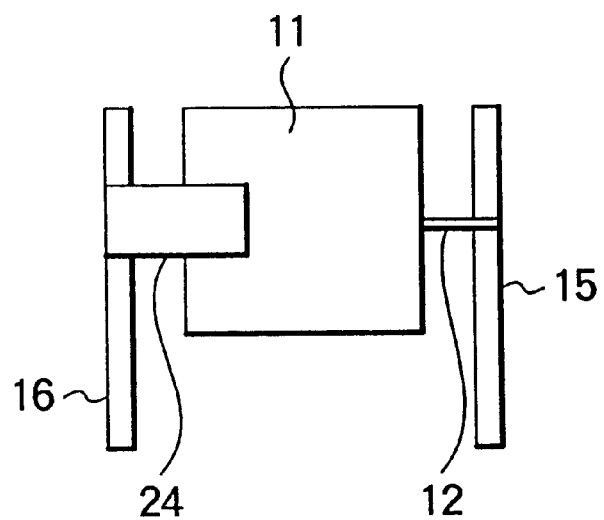
FIG. 2 is a top plan view of a capacitor during fabrication by another conventional method.

Now the present invention will be described in detail with reference to the accompanying drawings, wherein similar constituent elements are designated by the same reference numerals throughout the drawings.

Figure 3A:
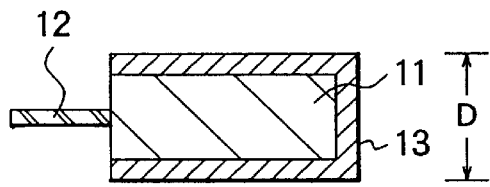
FIGS. 3A to 3E are longitudinal sectional views of a capacitor in consecutive steps of a process according to a first embodiment of the present invention.

FIGS. 3A to 3E show a capacitor in an actual process according to a first embodiment of the present invention. In FIG. 3A, the capacitor before connection comprised a capacitor body 11 made of tantalum particles and configured as a pellet, i.e., prism in this embodiment. An anode electrode 12 was inserted to the pellet 11 during the shaping thereof and extended from the top surface of the pellet 11. The surface of the pellet 11 was covered by a tantalum oxide film (not shown), a semiconductor layer (not shown) and a cathode conductor layer 13 consecutively, with the cathode conductor layer 13 being the outermost film.

The cathode conductor layer 13 contained an epoxy-resin based conductive material in an concentration more than about 60 weight percent of the total material. The epoxy-resin based material may include conductive fillers made of metallic particles such as silver or copper dispersed therein and capable of being soldered. The cathode conductor layer 13 had a thickness of approximately 50 mm.

Figure 3B:
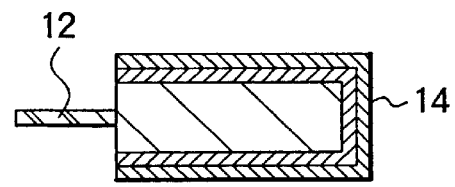

The side surface and bottom surface of the capacitor body 11 was then covered, as shown in FIG. 3B, by a solder layer 14 by immersing the capacitor body 11, in a batch process, into a melted solder having a high melting point. The solder layer 14 had a thickness of approximately 50 mm.

Figure 3C:
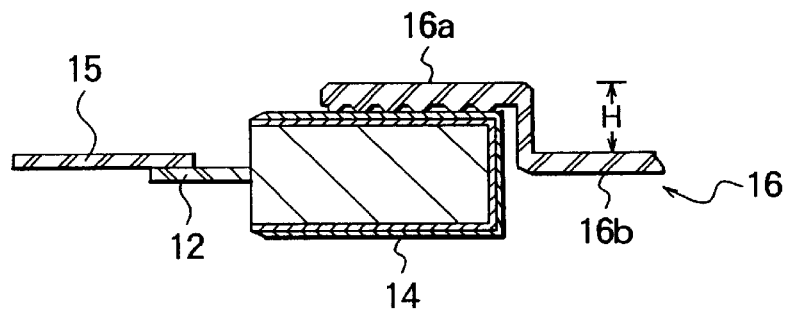

A lead frame having a plurality of pairs of anode lead 15 and cathode lead 16 was prepared beforehand for a plurality of capacitor bodies 11 by etching or punching a metallic thin plate. The anode lead 15 is straight, as shown in FIG. 3C, whereas the cathode lead 16 has an offset "H" between the first portion 16a for connection with the cathode conductor layer 14 and the second portion 16b adjacent to the first portion 16a. The lead frame was positioned such that the anode lead 15 was in contact with the anode electrode 12 and the first portion 16a of the cathode lead 16 was in contact with the cathode conductor layer 14, as shown in FIG. 3C. The lead frame may be formed from 0.10–0.15 mm thick nickel silver or 42-alloy and has a resilient or spring function required for the following welding step.

Figure 3D:
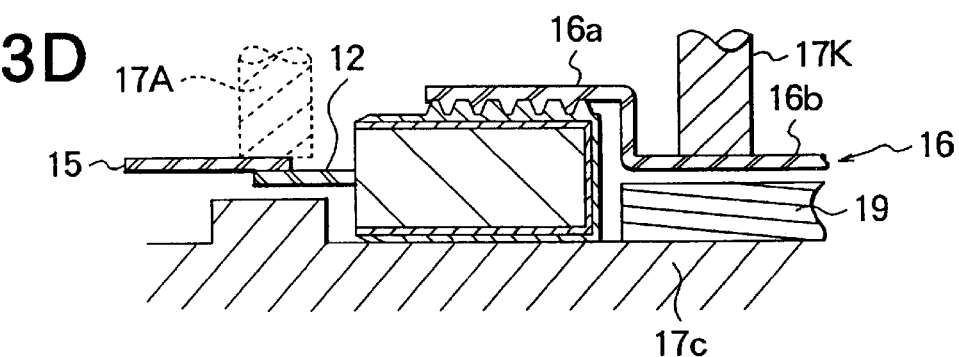
Figure 3E:
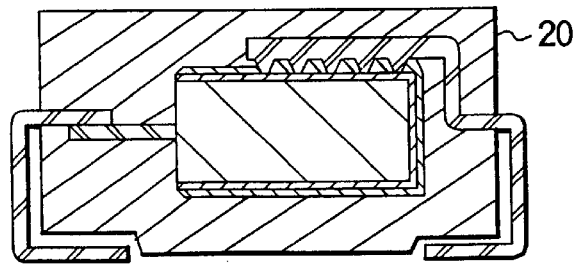

The anode lead 15 and cathode lead 16 in the lead frame were then electrically welded to the anode electrode 12 and cathode conductor layer 13, respectively, as shown in FIG. 3D. The welding was effected simultaneously for the cathode side of the capacitor body 11 shown in FIG. 3D and the anode side for the adjacent capacitor body not shown, by the current flowing between the top cathode electrode 17K and the bottom electrode 17C for welding and by the current flowing between the top anode electrode 17A and the bottom electrode 17C for welding, each top electrode 17K or 17A sandwiching the welding portion of the cathode side or anode side in association with the common bottom electrode 11C.

Figure 4:
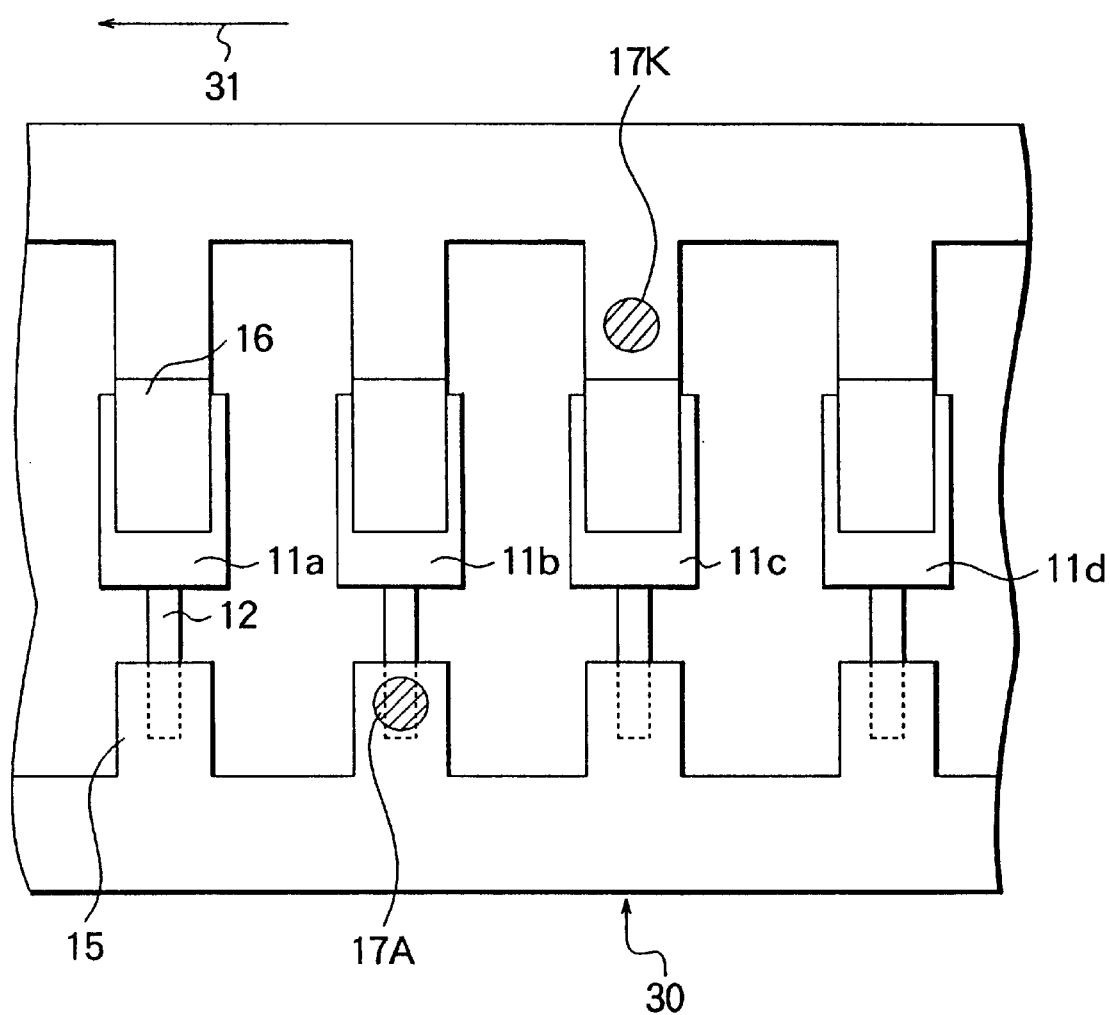
FIG. 4 is a top plan view of the arrangement of a lead frame and welding electrodes used in the process according to the first embodiment.

FIG. 4 shows the step of FIG. 3D for welding the anode and cathode leads of the lead frame 30 to the electrodes of the capacitor bodies. The top anode electrode 17A for welding the anode side is positioned at the anode side of one of the capacitor bodies, i.e., the second capacitor body 11b as viewed from the left in the figure. The top cathode electrode 17K for welding the cathode side is positioned at the cathode side of the third capacitor body 11c located at the right to the second capacitor body 11b. The offset positional relationship between the top electrodes 17A and 17K allows the simultaneous welding of the anode side of the second capacitor body 11b and the cathode side of the third capacitor body 11c without problem.

After one-pitch movement of the top welding electrodes 17A and 17K in the left as shown by the arrow 31, the anode side of the first capacitor body 11a and the cathode side of the second capacitor body 11b can be welded simultaneously, followed by subsequent one-pitch movement and next similar welding. Although, the connection by the present embodiment does not effect simultaneous welding of the anode side and cathode side of a single capacitor body, the presence of a large number of the capacitor bodies allows substantially a single welding step per a single capacitor body.

The offset arrangement of the top anode electrode 17A and top cathode electrode 17K for welding also prevents the reduction in reliability of the resultant capacitors, which may otherwise occur due to the offset timing of the large welding voltage to a single capacitor body. Specifically, if the electric welding is simultaneously effected to the anode side and cathode side of a single capacitor body, an offset timing of application of the welding voltage which is likely to occur between the anode side and cathode side raises the electric field in the insulator film of the capacitor body to thereby damage the insulator film. Further, the positional relationship between the top welding electrodes and the bottom welding electrode allows a sufficient space for welding in a small-sized capacitor unlike the parallel gap welding.

Referring back to FIG. 3D, the top cathode 17K and bottom electrode 17C are shown to be in contact with the cathode lead 16 and the cathode solder layer 14 of the capacitor body 11, respectively. The top cathode electrode 17K for welding is in contact with the second portion of the cathode lead 16 at the location about 1 mm apart from the edge of the capacitor body 11. At this step, the anode electrode 15 of the capacitor body 11 under the welding for the cathode side is not in contact with the top anode electrode 17A for welding to prevent the excess voltage from being applied between the anode electrode 12 and the cathode conductor layer 13.

An insulator layer 19 was inserted, between the bottom welding electrode 17C and the second portion 16b of the cathode lead 16 onto which the top cathode electrode 17K for welding is pressed, before applying the pressing force and supplying the welding current. The pressing force of about 500 gram was applied to the top cathode electrode 17K against the insulating layer 19 and bottom electrode 17C. Moved distance of 0.5 mm for the top cathode electrode 17K by the pressing force provided a suitable 100 to 200 gram pressure to the capacitor body 11, which did not damage the tantalum oxide film of the capacitor body 11.

Subsequently, a pulse welding current is provided from outside to generate a joule heat for melting the solder layer 14, thereby connecting the solder layer 14 with the cathode lead 16 electrically and mechanically. The welding current had a 30 to 40 ampere pulse amplitude and a 1-millisecond pulse duration. The pulse welding current flowing between the anode electrode 12 and the anode lead 15 is similar to the pulse welding current for the cathode side. The length of time required for the welding was 0.3 to 1.0 seconds per a capacitor, including the length of time for lowering and raising the top welding electrodes 17K and 17A. In this embodiment, the cathode lead 16 is provided with a plurality of protrusions thereon having a 0.05 to 0.1 mm height at the location where the cathode lead 16 is in contact with the solder layer 14.

A molding resin 20 is then provided to cover the entire surface of the capacitor body 11, allowing the free ends of the anode lead 15 and cathode lead 16 to protrude from the mold resin 20. The anode and cathode leads 15 and 16 are cut to a suitable length and subjected to a bending operation to provide the final product of FIG. 3E.

Figure 5:
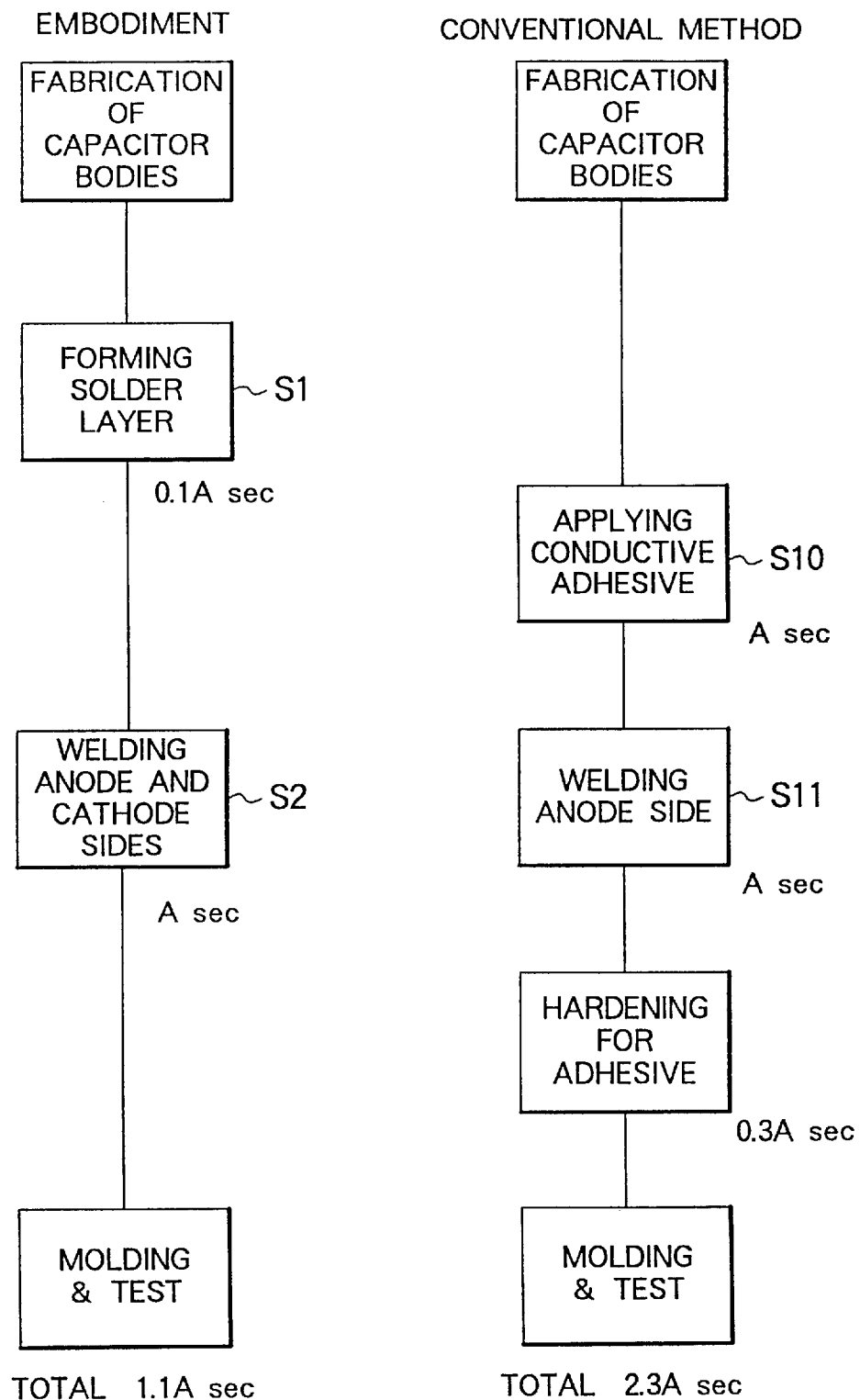
FIG. 5 is a flowchart showing length of time for connection in the first embodiment and the conventional method.

FIG. 5 shows flowcharts for showing a comparison of the length of time required to fabricate 1000 capacitors in the present embodiment and that in the conventional method using the conductive adhesive. Fabrication of the capacitor bodies, molding of the same and a final test are common to both the present embodiment and the conventional method. Accordingly, only the length of time for the connection step for connecting the leads and electrodes is shown for comparison, with the length of time for fabrication of the capacitor body, molding thereof and final test being omitted therein.

The present embodiment requires a soldering step S1, in which 1000 capacitor bodies are subjected to bath soldering in a batch process. The soldering step S1 requires about 0.1 A seconds per a capacitor, wherein "A" represents a length of time in second for a welding step S2 for welding both the anode sides and cathode sides for the 1000 capacitors. Accordingly, the present embodiment requires only 1.1 A seconds for fabrication of the 1000 capacitors.

On the other hand, the conventional method includes an adhesive coating step S10 for connection of the cathode side which requires A seconds for 1000 capacitors, a welding step S11 for anode connection which requires A seconds for the 1000 capacitors, and a hardening step S12 for hardening the adhesive which requires 0.3 A seconds for the 1000 capacitors, thereby requiring a total of 2.3 A seconds for the 1000 capacitors in the conventional method. Thus, the present embodiment achieves a reduction of the processing time by about a half of the processing time for the conventional method.

Further, the present embodiment avoids an excess pressing force or pressure applied to the capacitor body during the welding. The present invention is compared against the conventional method using the welding electrodes which directly sandwich the capacitor body therebetween in terms of a ratio of defective products having a large leakage current to the total products. The conventional method exhibited a 1.0 to 10 percent of the defective products, whereas the present embodiment exhibited a ratio of the defective products below 0.2 percent due to the soft pressing force. Thus, the present embodiment achieved a reduction of the defective rate by below 1/50 compared to the conventional method, showing a remarkable advantage of the present invention.

Although it is described that the present embodiment uses a soldering material having a high melting point, the soldering material may be an eutectic solder or a solder having a low melting point in the present invention. The protrusion as formed on the cathode lead may be omitted.

FIGS. 6A to 6E show consecutive steps in a process for fabricating a capacitor according to a second embodiment of the present invention.

Figure 6A:
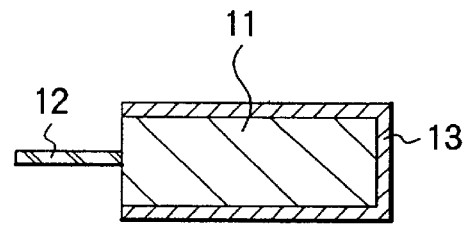
FIGS. 6A to 6E are longitudinal sectional views of another capacitor in consecutive steps of a process according to a second embodiment of the present invention.
Figure 6B:
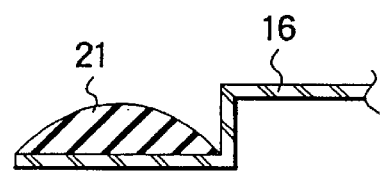
Figure 6C:
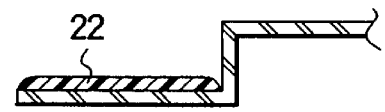

The capacitor body was fabricated similarly to the first embodiment, as shown in FIG. 6A. A lead frame having a plurality of cathode leads 16 and anode leads are also prepared similarly to the first embodiment, and was subjected to application of a creaming solder 21, as shown in FIG. 6B, following which the creaming solder 21 was thermally melted and re-solidified to form a solder layer 22 on a first portion of the cathode lead 16 to be in contact with the cathode conductor layer 14 of the capacitor body 11, as shown in FIG. 6C. The solder layer 22 on the cathode lead 16 had a thickness of about 150 microns. If the creaming solder is conductive after application of the same onto the cathode lead 16, the melting and re-solidifying steps may be omitted accordingly.

Figure 6D:
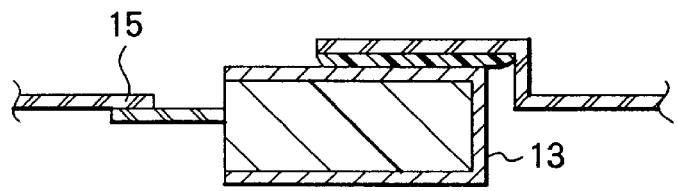
Figure 6E:
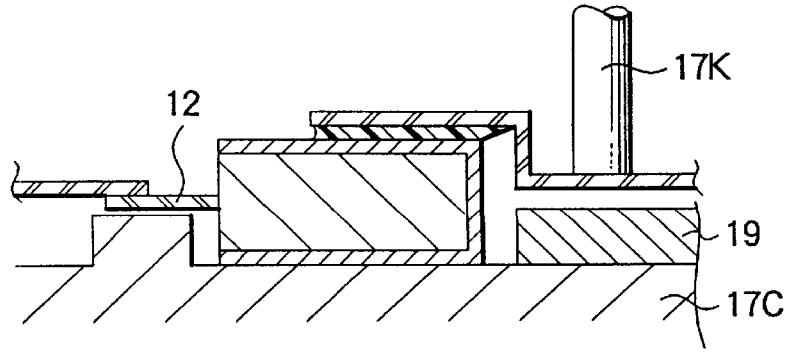

The cathode lead 16 was disposed such that the solder layer 22 on the cathode lead 16 is in contact with the cathode conductor layer 14 of the capacitor body 11, as shown in FIG. 6D. The capacitor body 11 had no solder layer on the cathode conductor layer 14. A top cathode electrode 17K for welding is then pressed against a second portion of the cathode lead 16 which is apart from the edge of the capacitor body 11, similarly to the first embodiment, thereby electrically welding the cathode lead 16 to the cathode conductor layer 14 simultaneously with welding for the anode side of an adjacent capacitor body. After welding both the cathode side and the anode side, the entirety of the capacitor body 11 is covered by a molding resin not shown, subjected to a bending step for the cathode and anode leads, similarly to the first embodiment, to provide a final product.

In the second embodiment, the solder layer 14 formed on the cathode conductor layer 13 in the first embodiment is omitted and the soldering for the lead frame can be effected in a pre-treatment for the lead frame to thereby simplify the fabrication steps in the present embodiment.

In both the embodiments, the anode and cathode leads were simultaneously welded to the electrodes of the capacitor body to save the length of time for the welding step. The welding step may be completed within a second, for example.

The welding operation is effected by a pair of welding electrodes for each of the anode and cathode sides, the pair of welding electrodes being disposed opposite to each other in the direction perpendicular to the moving plane of the welding electrodes or the array of the capacitor bodies, which saves the space for the welding operation and can be applied to a small-sized capacitors having a small cathode lead.

In the electric welding of the embodiments, the pressing force is not applied directly to the capacitor body, which prevents the insulator layer of the capacitor body from being damaged.

Although the present invention is described with reference to preferred embodiments thereof, the present invention is not limited thereto and various modifications or alterations can be easily made from the embodiments by those skilled in the art without departing from the scope of the present invention as set forth in the appended claims.

What is claimed is:

1. A method for manufacturing an electrolytic capacitor comprising the steps of preparing a capacitor body having an anode electrode protruding from the capacitor body and a cathode conductor layer formed on the capacitor body, connecting an anode lead to the anode electrode, making a first portion of a cathode lead in contact with the cathode conductor layer with an intervention of a solder layer, making first and second welding electrodes in contact with a second portion of the cathode lead adjacent to the first portion and the cathode conductor layer, refectively, pressing the first welding electrode toward the second welding electrode to thereby press the first portion to the cathode conductor layer, supplying welding current between the first welding electrode and second welding electrode to connect the cathode conductor layer to the cathode lead with the solder.

2. A method as defined in claim 1 further including the step of forming the solder layer on the cathode conductor layer.

3. A method as defined in claim 1 further including the step of forming the conductor layer on the cathode lead.

4. A method as defined in claim 1 wherein the cathode lead has a plurality of protrusions on the first portion contacting the cathode conductor layer.

5. A method for manufacturing electrolytic capacitors comprising the steps of preparing first and second capacitor bodies each having an anode electrode protruding from the capacitor body and a cathode conductor layer formed on the capacitor body, making an anode lead in contact with the anode electrode of the first capacitor body, making a first portion of a cathode lead in contact with the cathode conductor layer of the second capacitor body with an intervention of a solder layer, making first and second welding electrodes in contact with the anode lead and a second portion of the cathode lead adjacent to the first portion, respectively, making a third electrode in contact with the anode electrode and the cathode conductor layer, pressing the first and second welding electrodes toward the third welding electrode to thereby press the anode lead to the anode electrode and the first portion to the cathode conductor layer, supplying welding current between the first and second welding electrodes and third welding electrode to thereby connect the anode lead to the anode electrode of the first capacitor body and the cathode lead to the cathode conductor layer of the second capacitor body.

6. A method as defined in claim 5 further including the step of forming the solder layer on the cathode conductor layer.

7. A method as defined in claim 5 further including the step of forming the conductor layer on the cathode lead.

8. A method as defined in claim 5 wherein the cathode lead has a plurality of protrusions on the first portion contacting the cathode conductor layer.

9. A method for manufacturing an electrolytic capacitor comprising the steps of preparing a lead frame having a plurality of lead pairs each including an anode lead and a cathode lead opposed to each other, each cathode lead having a first portion and a second portion adjacent to the first portion, preparing a plurality of capacitor bodies each having an anode electrode protruding from the each of the capacitor bodies and a cathode conductor layer formed on the each of the capacitor bodies, arranging the capacitor bodies correspondingly to the lead pairs to make the anode leads in contact with the anode electrodes of the respective capacitor bodies and to make the first portions of the cathode leads in contact with the cathode conductor layers of the respective capacitor bodies with an intervention of respective soldier layers, making first and second welding electrodes in contact with one of the anode leads and the second portion of one of the cathode leads, respectively, making a third electrode in contact with the anode electrodes and the cathode conductor layers, pressing the first and second welding electrodes toward the third welding electrode to thereby press the one of the anode leads to a corresponding one of the anode electrodes and the first portion of the one of the cathode leads to a corresponding one of the cathode conductor layers, supplying welding current between the first and second welding electrodes and third welding electrode to connect the one of the anode leads to the corresponding one of the anode electrodes and the first portion of the one of the cathode leads to the corresponding one of the cathode conductor layers.

10. A method as defined in claim 9 further including the step of forming the solder layer on the cathode conductor layer.

11. A method as defined in claim 9 further including the step of forming the conductor layer on the cathode lead.

12. A method as defined in claim 9 wherein the cathode lead has a plurality of protrusions on the first portion contacting the cathode conductor layer.

13. A method as defined in claim 9 wherein the one of the cathode leads is adjacent to another of the cathode leads opposed to the one of the anode leads.

* * * * *

UNITED STATES PATENT AND TRADEMARK OFFICE
CERTIFICATE OF CORRECTION

PATENT NO. : 5,968,209
DATED : October 19, 1999
INVENTOR(S) : Kono

It is certified that error appears in the above-identified patent and that said Letters Patent are hereby corrected as shown below:

Col. 7, Line 30, "refectively" should be - -respectively- -.

Signed and Sealed this

Twenty-ninth Day of May, 2001

Attest:

NICHOLAS P. GODICI

Attesting Officer                Acting Director of the United States Patent and Trademark Office